United States Patent
Liang et al.

(10) Patent No.: US 8,354,996 B2
(45) Date of Patent: Jan. 15, 2013

(54) ELECTRONIC READING APPARATUS AND INPUT METHOD THEREOF

(75) Inventors: Hai-Sen Liang, Shenzhen (CN); Te-Jia Liu, Shenzhen (CN); Ming-Quan Lai, Shenzhen (CN); Hui-Ling Ru, Shenzhen (CN); Chih-San Chiang, Taipei Hsien (TW); Han-Che Wang, Taipei Hsien (TW)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 263 days.

(21) Appl. No.: 12/977,081

(22) Filed: Dec. 23, 2010

(65) Prior Publication Data

US 2012/0026086 A1   Feb. 2, 2012

(30) Foreign Application Priority Data

Jul. 29, 2010   (CN) .......................... 2010 1 0240219

(51) Int. Cl.
*G09G 5/08* (2006.01)

(52) U.S. Cl. .......... 345/157; 345/156; 345/173
(58) Field of Classification Search .......... 345/156–179; 178/18.01–18.09
See application file for complete search history.

(56) References Cited

U.S. PATENT DOCUMENTS

2008/0109763 A1   5/2008  Lee

FOREIGN PATENT DOCUMENTS

| CN | 101178631 A | 5/2008 |
| CN | 101441540 A | 5/2009 |

*Primary Examiner* — Amare Mengistu
*Assistant Examiner* — Premal Patel
(74) *Attorney, Agent, or Firm* — Altis Law Group, Inc.

(57) ABSTRACT

An electronic reading apparatus comprises an input unit receiving input operations, a detect unit detecting and capturing images reflected by the input unit and a processing unit configured to receive the images to generate interruption signals; determine whether the number of the interruption signals reaches a pre-determined value in a pre-determined time; calculate a movement direction and a distance of the object on the input unit if the number of the interruption signals reaches the pre-determined value in the pre-determined time; determine a cursor displacement on the display unit and display a movement track of the cursor on a display unit. An input method for previewing files is also provided.

13 Claims, 3 Drawing Sheets

ELECTRONIC READING APPARATUS AND INPUT METHOD THEREOF

BACKGROUND

1. Technical Field

The present disclosure relates to electronic reading apparatuses and, particularly, to an electronic reading apparatus and an input method thereof.

2. Description of the Related Art

Conventionally, an electronic reading apparatus provides buttons for readers to input operations. However this repetitive process may cause readers to feel tired and bored if they are pressing the buttons repeatedly, moreover, the buttons occupy space that may be put for better use.

BRIEF DESCRIPTION OF THE DRAWINGS

The components of the drawings are not necessarily drawn to scale, the emphasis instead being placed upon clearly illustrating the principles of an electronic reading apparatus and an input method thereof. Moreover, in the drawings, like reference numerals designate corresponding parts throughout multiple views.

DETAILED DESCRIPTION

Figure 1:
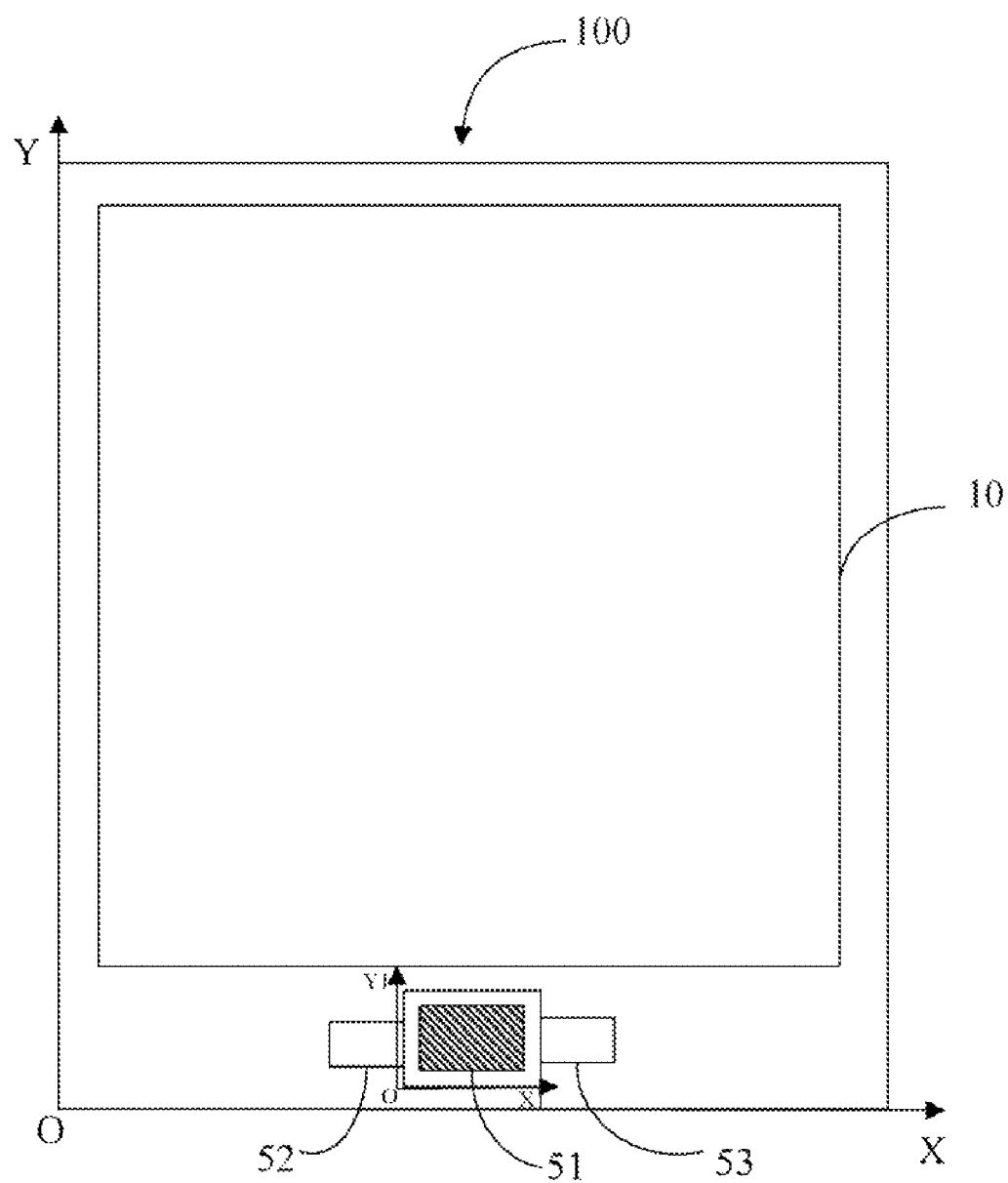
FIG. 1 is a schematic view of an electronic reading apparatus in accordance with an exemplary embodiment.
Figure 2:
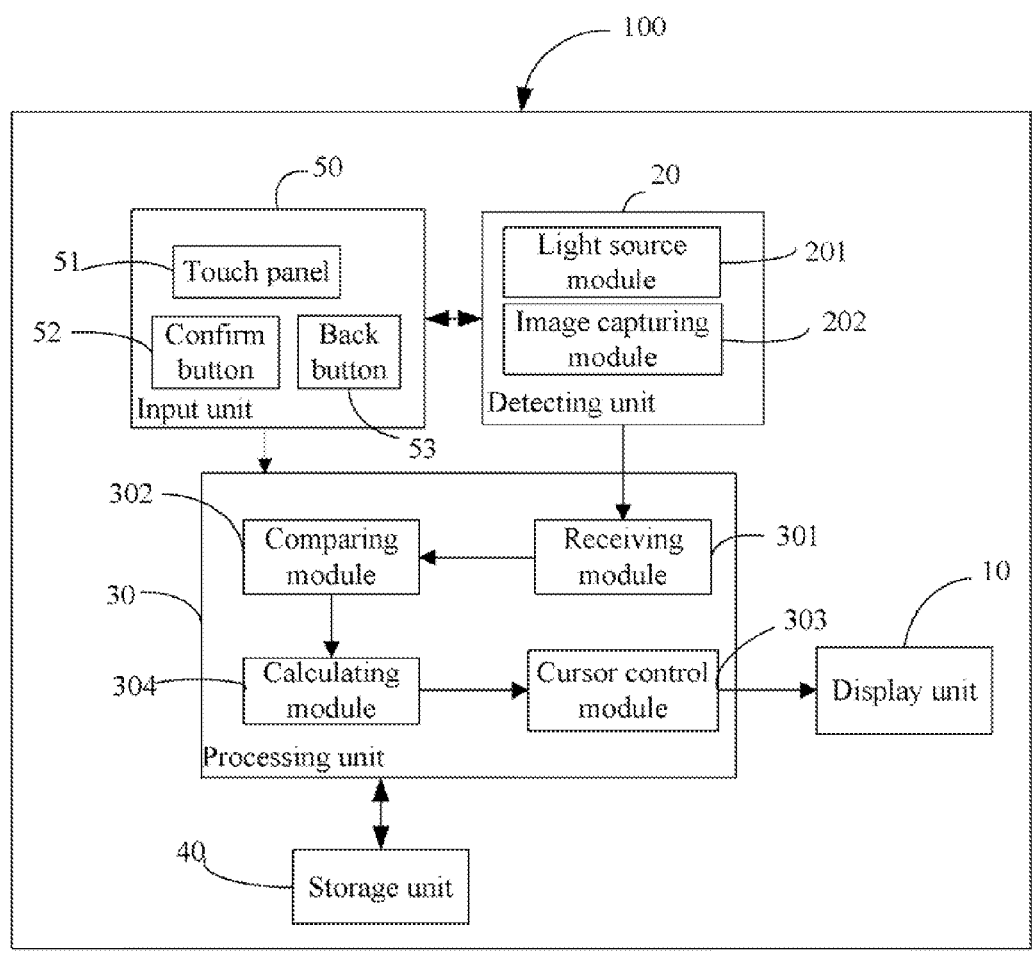
FIG. 2 is a block diagram of a hardware infrastructure of the electronic reading apparatus of FIG. 1.

Referring to FIGS. 1 and 2, an electronic reading apparatus 100 includes a display unit 10, a detecting unit 20, a processing unit 30, a storage unit 40, and an input unit 50. In this embodiment, the electronic reading apparatus 100 may be a mobile phone, an E-book, an audio player, and the like. The storage unit 40 stores readable files.

The input unit 50 generates input signals in response to user input. The input unit 50 includes a touch panel 51. The touch panel 51 is for receiving a multi-point touch or a single-point touch. In the embodiment, the input unit 50 further includes a confirm button 52 and a back button 53. The confirm button 52 is used for generating a confirm signal for confirming input of a selected object, for example, a desired icon displayed on a display interface. The back button 53 is used for generating a back signal for initiating return to a previous view.

The detecting unit 20 is used for detecting touch operation of an object on the touch panel 51 and capturing images reflected by the touch panel 51. In the embodiment, the detecting unit 20 includes a light source module 201 and an image capturing module 202. The light source module 201 and the image capturing module 202 are mounted inside the electronic reading apparatus 100. The light source module 201 emits light rays to the touch panel 51 from the inside of the electronic reading apparatus 100, and the light rays are reflected by the touch panel 51 to generate images to be captured by the image capturing module 202. When an object touches on the touch panel 51, the image capturing module 202 captures an image with a projection point reflected by the touch panel 51 and transmits the image to the processing unit 30. When the object slides on the touch panel 51, the image capturing module 202 captures a series of images reflected by the touch panel 51 and transmits the images to the processing unit 30, and each captured image includes a projection point.

In the embodiment, the light source module 201 is a light-emitting diode (LED), and the image capturing module 202 is an image sensor, such as a CMOS (Complementary Metal-Oxide-Semiconductor Transistor).

The processing unit 30 generates interruption signals when the processing unit 30 receives the images, and further determines whether the number of interruption signals in a pre-determined time reaches a pre-determined value. If so, the processing unit 30 calculates a direction and a distance of movement of the object on the touch panel 51, according to a series of the images, to determine a corresponding displacement of a cursor displayed on the display unit 10. In the embodiment, the pre-determined time is an average time during which a single touch operation may be completed, such as 0.25 milliseconds. The processing unit 30 includes a receiving module 301, a comparing module 302, a cursor control module 303, and a calculating module 304. The receiving module 301 receives images transmitted by the image capturing module 202 to generate interruption signals, and transmits the interruption signals to the comparing module 302. The comparing module 302 calculates the number of the interruption signals and determines whether the number of the interruption signals reaches a pre-determined value T1 in the pre-determined time. If so, the calculating module 304 calculates the direction and the distance of movement of the object on the touch panel 51 based on a coordinate system using an X1 axis and a Y1 axis on the touch panel 51 (see FIG. 1) according to the received images. The cursor control module 303 determines a cursor displacement ($\Delta x$, $\Delta y$) on the display unit 10 according to the direction and the distance of movement of the object on the touch panel 51 and an original position of the cursor on the display unit 10 pre-stored in the storage unit 40, and controls the display unit 10 to display a movement track of the cursor according to the displacement.

Figure 3:
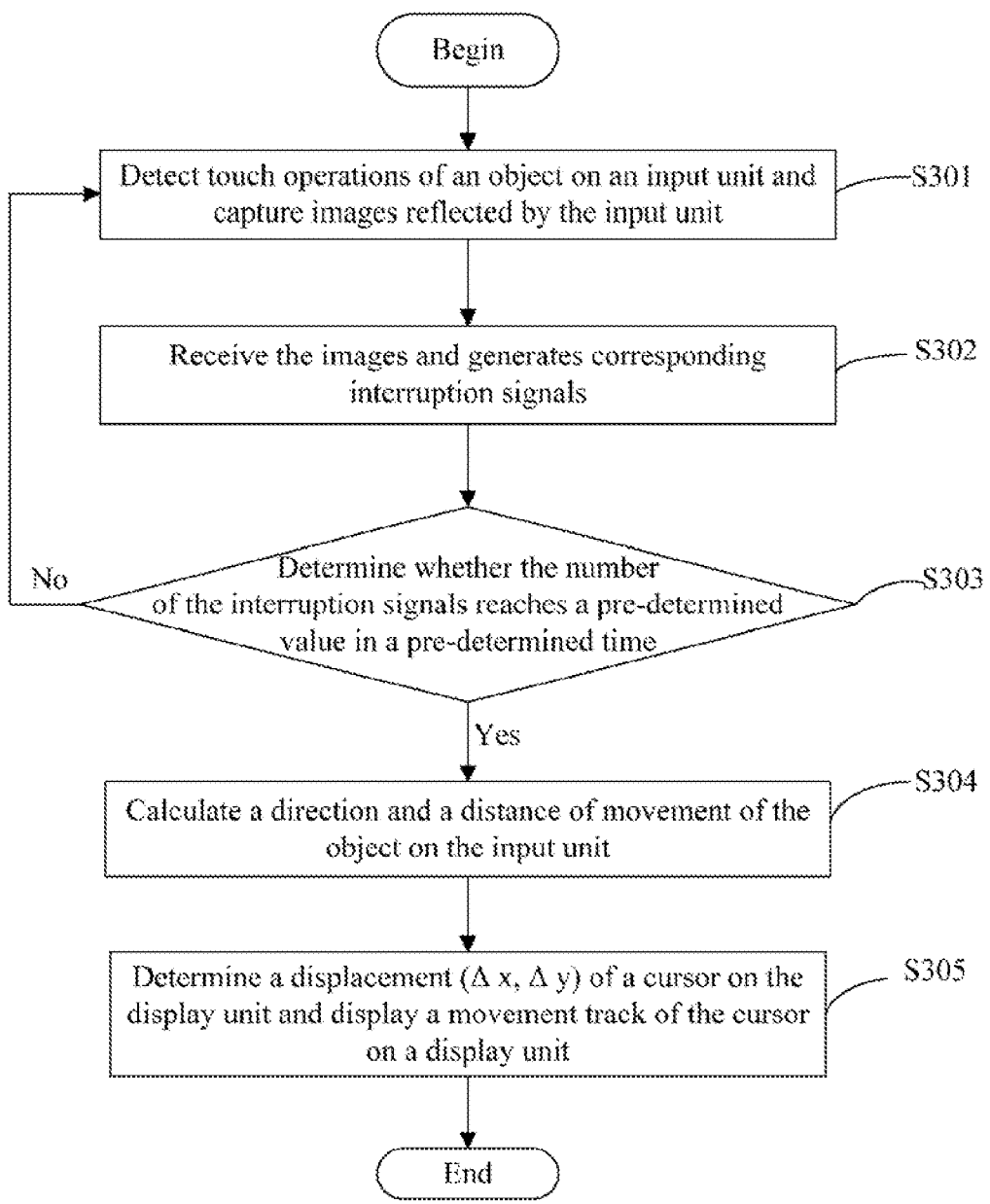
FIG. 3 is a flowchart of an input method applied in the electronic reading apparatus of FIG. 1 in accordance with an exemplary embodiment.

Referring to FIG. 3, showing an input method of the electronic reading apparatus 100 in accordance with an exemplary embodiment. The electronic reading apparatus 100 includes a display unit 10, a processing unit 30, and an input unit 50 with a touch panel 51.

In step S301, the detecting unit 20 detects touch operation of an object on the touch panel 51 and captures images reflected by the touch panel 51.

In step S302, the receiving module 301 receives the images and generates corresponding interruption signals.

In step S303, the comparing module 302 calculates the number of the interruption signals and further determines whether the number of the interruption signals reaches a pre-determined value T1 in the pre-determined time.

If the number of the interruption signals reaches the pre-determined value in the pre-determined time, in step S304, the calculating module 304 calculates the direction and the distance of movement of the object on the touch panel 51, based on the XY coordinate system, according to the received images, otherwise, the procedure goes to step S301.

In step S305, the cursor control module 303 determines a cursor displacement ($\Delta x$, $\Delta y$) on the display unit 10 according to the direction and the distance of movement of the object on the touch panel 51 and the original position of the cursor on the display unit 10 pre-stored in the storage unit 40, and controls the display unit 10 to display the movement track of the cursor according to the displacement.

Although the present disclosure has been specifically described on the basis of the exemplary embodiment thereof, the disclosure is not to be construed as being limited thereto. Various changes or modifications may be made to the embodiment without departing from the scope and spirit of the disclosure.

What is claimed is:

1. An electronic reading apparatus comprising:
   a display unit;
   an input unit to generate input signals in response to user inputs;
   a detecting unit to detect touch operations of an object on the input unit and capture images reflected by the input unit; and
   a processing unit configured to:
   receive the images to generate interruption signals;
   calculate the number of the interruption signals and determine whether the number of the interruption signals reaches a pre-determined value in a pre-determined time;
   calculate a direction and a distance of movement of the object on the input unit if the number of the interruption signals reaches the pre-determined value in the pre-determined time;
   determine a cursor displacement on the display unit according to the direction and the distance of movement of the object on the input unit; and
   display a movement track of the cursor according to the displacement on the display unit.

2. The electronic reading apparatus as claimed in claim 1, wherein the input unit comprises a touch panel, the touch panel is for receiving a multi-point touch or a single-point touch.

3. The electronic reading apparatus as described in claim 2, wherein the detecting unit comprises a light source module and an image capturing module, both of them are mounted inside the electronic reading apparatus; the light source module emits light rays to the touch panel, and the light rays are reflected by the touch panel to generate images to be captured by the image capturing module.

4. The electronic reading apparatus as described in claim 3, wherein the processing unit comprises a receiving module and a comparing module, the receiving module receives images transmitted by the image capturing module and generates interruption signals, and transmits the interruption signals to the comparing module.

5. The electronic reading apparatus as described in claim 4, wherein the processing unit further comprises a calculating module to calculate the direction and the distance of movement of the object on the touch panel based on a coordinate system for the touch panel and the received images.

6. The electronic reading apparatus as described in claim 1, wherein the input unit further comprises a confirm button and a back button; the confirm button is used for generating a confirm signal for confirming input of a selected object, the back button is used for generating a back signal for initiating to return to a previous view place.

7. The electronic reading apparatus as described in claim 1, wherein the pre-determined time is an average time during which a single touch operation can be completed.

8. The electronic reading apparatus as described in claim 1, wherein each of the images reflected by the input unit comprises a projection point generated by the object.

9. An input method applied in an electronic reading apparatus, comprising:
   detecting touch operations of an object on an input unit and capturing images reflected by the input unit;
   receiving the images and generating corresponding interruption signals;
   calculating the number of the interruption signals and determine whether the number of the interruption signals reaches a pre-determined value in a pre-determined time;
   calculating a direction and a distance of movement of the object on the input unit if the number of the interruption signals reaches the pre-determined value in the pre-determined time;
   determining a cursor displacement on a display unit according to the movement direction and the distance of the object on the input unit; and
   displaying a movement track of the cursor according to the displacement on the display unit.

10. The input method as described in claim 9, wherein the input unit comprises a touch panel, the touch panel is for receiving a multi-point touch or a single-point touch.

11. The input method as described in claim 9, wherein the pre-determined time is an average time during which a single touch operation can be completed.

12. The input method as described in claim 9, wherein if the number of the interruption signals does not reach the pre-determined value in the pre-determined time, continuously detecting touch operation of the object on and capturing next images.

13. The input method as described in claim 9, wherein each of the images reflected by the input unit comprises a projection point generated by the object.

* * * * *